(12) United States Patent
Zhang

(10) Patent No.: US 10,250,141 B2
(45) Date of Patent: Apr. 2, 2019

(54) CONTROL CIRCUIT FOR BUCK-BOOST POWER CONVERTER WITH SEAMLESS MODE TRANSITION CONTROL

(71) Applicant: Chengdu Monolithic Power Systems Co., Ltd., Chengdu (CN)

(72) Inventor: Jian Zhang, Chengdu (CN)

(73) Assignee: Chengdu Monolithic Power Systems Co., Ltd. (CN)

( * ) Notice: Subject to any disclaimer, the term of this patent is extended or adjusted under 35 U.S.C. 154(b) by 160 days.

(21) Appl. No.: 15/166,199

(22) Filed: May 26, 2016

(65) Prior Publication Data

US 2016/0352228 A1    Dec. 1, 2016

(30) Foreign Application Priority Data

May 26, 2015 (CN) .......................... 2015 1 0272741

(51) Int. Cl.
*H02M 3/158* (2006.01)
*H02M 1/32* (2007.01)
*H02M 1/00* (2006.01)

(52) U.S. Cl.
CPC ........... *H02M 3/1582* (2013.01); *H02M 1/32* (2013.01); *H02M 2001/0009* (2013.01)

(58) Field of Classification Search
CPC .... H02M 3/1588; H02M 3/156; H02M 3/158; H02M 3/1582; Y02B 70/1466
See application file for complete search history.

(56) References Cited

U.S. PATENT DOCUMENTS

2015/0002116 A1*  1/2015 Bernon-Enjalbert .........................
H02M 3/1582
323/271

* cited by examiner

*Primary Examiner* — Nguyen Tran
*Assistant Examiner* — Monica Mata
(74) *Attorney, Agent, or Firm* — Perkins Coie LLP

(57) ABSTRACT

A buck-boost power converter and a control circuit for the buck-boost converter. The control circuit includes a buck cycle pulse width modulation module and a boost cycle pulse width modulation module respectively having a first controllable hysteresis and a second controllable hysteresis. The buck cycle pulse width modulation module can regulate the first controllable hysteresis during the buck-boost power converter transits between a buck mode and a buck-boost mode so as to eliminate or at least reduce sparks in an output voltage. The boost cycle pulse width modulation module can regulate the second controllable hysteresis during the buck-boost power converter transits between the buck-boost mode and a boost mode so as to eliminate or at least reduce sparks in the output voltage.

14 Claims, 9 Drawing Sheets

CONTROL CIRCUIT FOR BUCK-BOOST POWER CONVERTER WITH SEAMLESS MODE TRANSITION CONTROL

CROSS REFERENCE

This application claims the benefit of CN application No. 201510272741.X filed on May 26, 2015 and incorporated herein by reference.

TECHNICAL FIELD

This disclosure relates generally to buck-boost power converters, and more particularly but not exclusively relates to control circuit of buck-boost power converters.

BACKGROUND

Buck-boost power converters can convert an input voltage into an output voltage higher than, equal to or lower than the input voltage and can generally be operated with wide input voltage range. Therefore, buck-boost power converters are widely used in power management applications.

FIG. 1 illustrates a topology 10 of the power switches of a conventional buck-boost power converter. The topology 10 comprises a first power switch SWA, a second power switch SWB, a third power switch SWC and a fourth power switch SWD. The first power switches SWA and the second power switch SWB are coupled in series between an input port IN and a reference ground GND, and have a common connection SW1 referred to as a first switching node SW1. The third power switch SWC and the fourth power switch SWD are coupled in series between an output port OUT and the reference ground GND, and have a common connection SW2 referred to as a second switching node SW2. An inductor L is coupled between the first switching node SW1 and the second switching node SW2. The buck-boost power converter typically further comprises a control circuit to provide driving signals respectively to the control terminals GA, GB, GC and GD of the power switches SWA, SWB, SWC and SWD to control the on and off switching of the power switches SWA, SWB, SWC and SWD so as to converter an input voltage Vin at the input port IN to an appropriate output voltage Vo at the output port OUT.

A buck-boost power converter having the topology 10 as shown in FIG. 1 may operate in buck mode when the input voltage Vin is higher than the output voltage Vo, and operate in buck-boost mode when the input voltage Vin is equal/close to the output voltage Vo, and operate in boost mode when the input voltage Vin is lower than the output voltage Vo. In buck mode, the fourth power switch SWD is maintained ON, the third power switch SWC is maintained OFF, while the first power switch SWA and the second power switch SWB are switched ON and OFF complementarily, i.e. when the first power switch SWA is switched ON, the second power switch SWB is switched OFF, and vice versa. In boost mode, the first power switch SWA is maintained ON, the second power switch SWB is maintained OFF, while the third power switch SWC and the fourth power switch SWD are switched ON and OFF complementarily, i.e. when the third power switch SWC is switched ON, the fourth power switch SWD is switched OFF, and vice versa. In buck-boost mode, the first power switch SWA and the second power switch SWB form a first switch pair while the third power switch SWC and the fourth power switch SWD form a second switch pair, and the first switch pair and the second switch pair conduct ON and OFF switching independently.

Theoretically, the buck-boost power converter can be controlled to convert the input voltage Vin into any appropriate output voltage Vo through changing its operation mode among the buck mode, the boost mode and the buck-boost mode. However, in practical, the existing buck-boost power converters cannot transit smoothly/seamlessly from one mode to another among the buck mode, the boost mode and the buck-boost mode. Large sparks may occur in the output voltage Vo during the transition.

SUMMARY

In accomplishing the above and other objects, there has been provided, in accordance with an embodiment of the present disclosure, a control circuit for regulating a buck-boost power converter.

The control circuit comprises: an operational amplifier configured to receive a first feedback signal indicative of an output voltage of the buck-boost power converter and a reference signal, and further configured to conduct operation to the first feedback signal and the reference signal to provide an amplified difference signal indicative of a difference between the first feedback signal and the reference signal.

The control circuit further comprises: a buck cycle pulse width modulation module configured to respectively receive the amplified difference signal and a first current sensing signal indicative of a switching current during a buck cycle of the buck-boost power converter, and to compare the first current sensing signal with the amplified difference signal to generate a first pulse width modulation signal for regulating a buck duty cycle of the buck-boost power converter, wherein the buck cycle pulse width modulation module has a first controllable hysteresis and a hysteresis control terminal which is configured to receive a first mode transition control signal, and wherein the buck cycle pulse width modulation module is further configured to enable the first controllable hysteresis in response to the first mode transition control signal when the buck-boost power converter transits from the buck mode to the buck-boost mode, and to disable the first controllable hysteresis in response to the first mode transition control signal when the buck-boost power converter transits from the buck-boost mode to the buck mode; and The control circuit further comprises: a boost cycle pulse width modulation module configured to respectively receive the amplified difference signal and a second current sensing signal indicative of a switching current during a boost cycle of the buck-boost power converter, and to compare the second current sensing signal with the amplified difference signal to generate a second pulse width modulation signal for regulating a boost duty cycle of the buck-boost power converter, wherein the boost cycle pulse width modulation module has a second controllable hysteresis and a hysteresis control terminal which is configured to receive a second mode transition control signal, and wherein the boost cycle pulse width modulation module is further configured to enable the second controllable hysteresis in response to the second mode transition control signal when the buck-boost power converter transits from the buck-boost mode to the boost mode, and to disable the second controllable hysteresis in response to the second mode transition control signal when the buck-boost power converter transits from the boost mode to the buck-boost mode.

In accomplishing the above and other objects, there has been provided, in accordance with another embodiment of the present disclosure, a buck-boost power converter. The buck-boost power converter comprises a switch module and the control circuit configured to control the switch module. The switch module includes a first power switch and a second power switch coupled in series between an input port and a reference ground, and a third power switch and a fourth power switch coupled in series between an output port and the reference ground.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

The use of the same reference label in different drawings indicates the same or like components or structures with substantially the same functions for the sake of simplicity.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
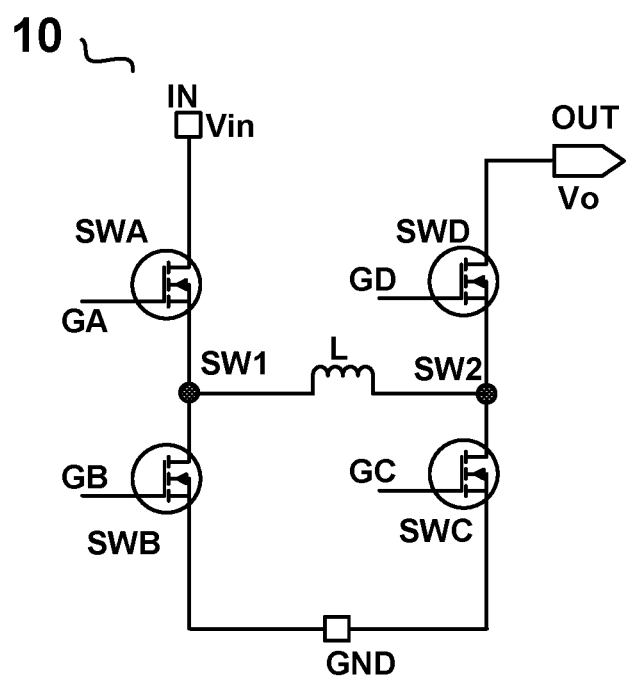
FIG. 1 illustrates a topology 10 of the power switches of a conventional buck-boost power converter.
Figure 2:
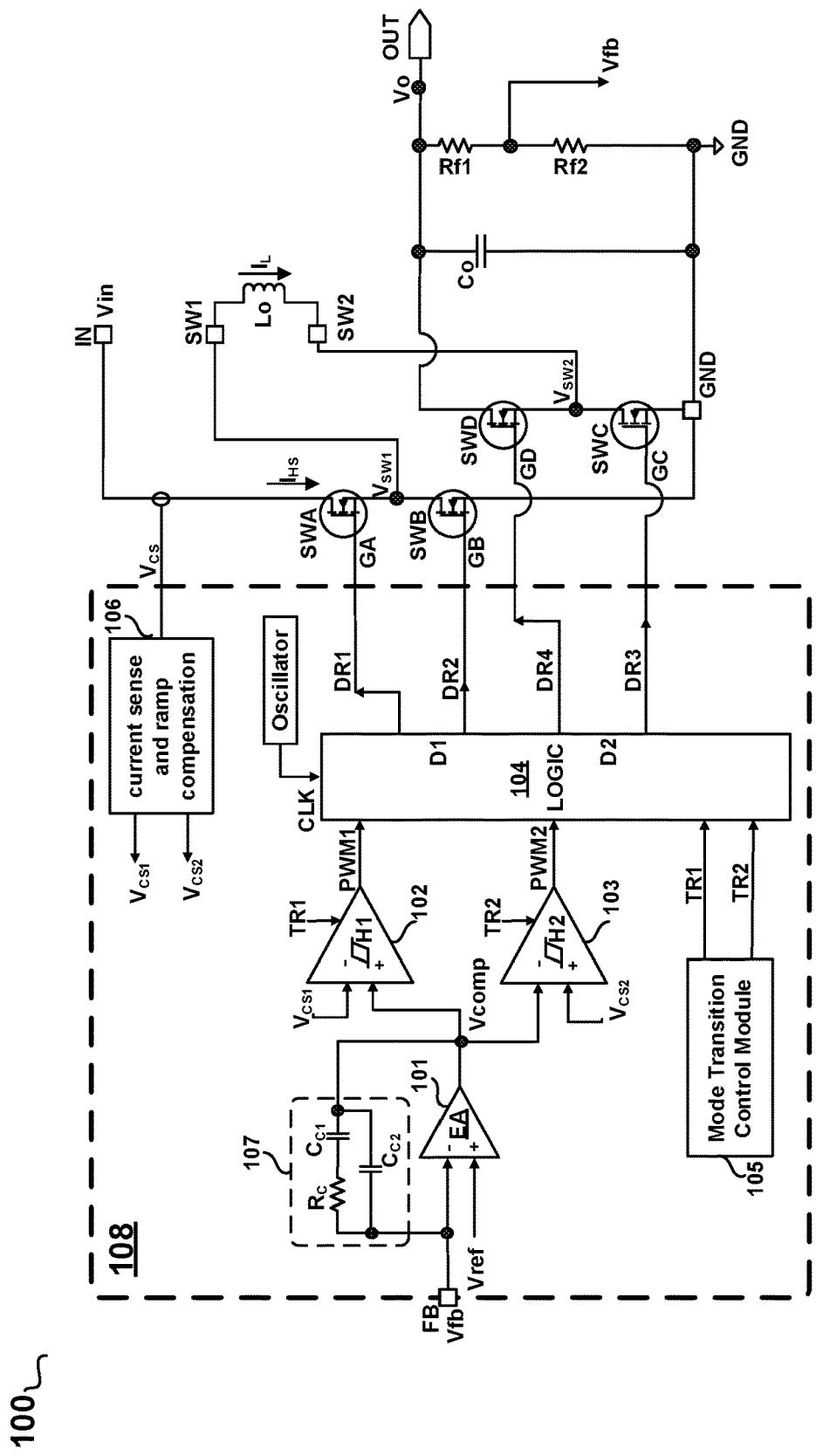
FIG. 2 illustrates a schematic diagram of a buck-boost power converter 100 and a control circuit 108 in accordance with an exemplary embodiment of the present invention.

FIG. 2 illustrates a schematic diagram of a buck-boost power converter 100 and a control circuit 108 in accordance with an exemplary embodiment of the present invention.

The buck-boost power converter 100 may be configured to receive an input voltage Vin at an input port IN and to provide an output voltage Vo and an output current Io for supplying a load at an output port OUT. The buck-boost power converter 100 may comprise a switch module, e.g. including a first power switch SWA, a second power switch SWB, a third power switch SWC and a fourth power switch SWD. The switch module may have a first terminal coupled to the input port IN, a second terminal coupled to the output port OUT, and a plurality of control terminals (e.g. a first control terminal GA, a second control terminal GB, a third control terminal GC and a fourth control terminal GD illustrated in FIG. 2) configured to respectively receive a plurality of control signals (e.g. a first control signal DR1, a second control signal DR2, a third control signal DR3 and a fourth control signal DR4 illustrated in FIG. 2). The switch module is configured to conduct ON and OFF switching based on the plurality of control signals so as to convert the input voltage Vin into the output voltage Vo. The buck-boost power converter 100 may further comprise a control circuit 108 configured to detect/receive a first feedback signal Vfb indicative of the output voltage Vo, a second feedback signal Vcs indicative of the output current Io and a reference signal Vref indicative of a desired value of the output voltage Vo. The control circuit 108 is configured to provide the plurality of control signals (e.g. including the first control signal DR1, the second control signal DR2, the third control signal DR3 and the fourth control signal DR4 illustrated in FIG. 2) to the switch module at least partially based on the first feedback signal Vfb, the second feedback signal Vcs and the reference signal Vref.

In accordance with an exemplary embodiment of the present invention, still referring to FIG. 2, the switch module of the buck-boost power converter 100 may have a topology comprising a first power switch SWA and a second power switch SWB coupled in series between the input port IN and a reference ground GND, and a third power switch SWC and a fourth power switch SWD coupled in series between the output port OUT and the reference ground GND, wherein the first power switch SWA and the second power switch SWB have a common connection SW1 referred to as a first switching node SW1, and the third power switch SWC and the fourth power switch SWD have a common connection SW2 referred to as a second switching node SW2. In an exemplary embodiment, an inductive energy storage component Lo is coupled between the first switching node SW1 and the second switching node SW2. In an exemplary embodiment, the first to fourth power switches SWA, SWB, SWC and SWD may comprise controllable switching components, such as metal oxide semiconductor field effect transistors (MOSFETs) as shown in FIG. 2. The first to fourth power switches SWA, SWB, SWC and SWD may respectively have their own control terminals, such as the first control terminal GA, a second control terminal GB, a third control terminal GC and a fourth control terminal GD illustrated in FIG. 2, to respectively receive the first control signal DR1, the second control signal DR2, the third control signal DR3 and the fourth control signal DR4.

In accordance with an exemplary embodiment of the present invention, the control circuit 108 adopts peak current control pulse width modulation mode to control the ON and OFF switching of the switch module of the buck-boost power converter 100. In an embodiment, the control circuit 108 is configured to at least provide the first control signal DR1, the second control signal DR2, the third control signal DR3 and the fourth control signal DR4 respectively to the first power switch SWA, the second power switch SWB, the third power switch SWC and the fourth power switch SWD. The first power switch SWA and the second power switch SWB form a first switch pair (also referred to as a buck switch pair). The third power switch SWC and the fourth power switch SWD form a second switch pair (also referred to as a boost switch pair). The control circuit 108 is configured to control the first switch pair and the second switch pair to conduct ON and OFF switching independently. The control circuit 108 regulates the buck-boost converter 100 to at least operate in one of the buck mode, the boost mode and the buck-boost mode according to the relative value of the input voltage Vin and the output voltage Vo.

In accordance with an exemplary embodiment of the present invention, the buck-boost power converter 100 is regulated to operate in the buck mode when the input voltage Vin is higher than the output voltage Vo. In the buck mode, the control circuit 108 is configured to regulate the first switch pair to conduct ON and OFF switching, and to regulate the third power switch SWC and the fourth power switch SWD in the second switch pair to respectively remain OFF and ON. In this situation, the buck-boost power converter 100 actually has a buck type topology. In an embodiment, in the buck mode, the control circuit 108 is configured to regulate the first power switch SWA and the second power switch SWB to switch ON and OFF complementarily, i.e. when the first power switch SWA is switched ON, the second power switch SWB is switched OFF, and vice versa. A fraction of an ON time of the first power switch SWA to an entire switching cycle of the first power switch SWA and the second power switch SWB is referred to as a buck duty cycle, and is labeled by D1 in the present disclosure.

In accordance with an exemplary embodiment of the present invention, the buck-boost power converter 100 is regulated to operate in the buck-boost mode when the input voltage Vin is equal or close to the output voltage Vo. In the buck mode, the control circuit 108 is configured to regulate the first switch pair and the second switch pair to conduct ON and OFF switching independently, and is further configured to control the first switch pair and the second switch pair to operate in turn switching cycle by switching cycle, wherein a switching cycle during which the first switch pair is operated to conduct ON and OFF switching is referred to as a buck switching cycle, and a switching cycle during which the second switch pair is operated to conduct ON and OFF switching is referred to as a boost switching cycle. In an embodiment, during a buck switching cycle, the control circuit 108 is configured to regulate the first power switch SWA and the second power switch SWB in the first switch pair to switch ON and OFF complementarily, and is further configured to regulate the third power switch SWC to remain OFF and the fourth power switch SWD to remain ON. Thus, during the buck switching cycle, when the first power switch SWA is switched ON and the second power switch SWB is switched OFF, the first power switch SWA and the fourth power switch SWD among the four power switches SWA, SWB, SWC and SWD are actually ON, and this situation is referred to as "AD" in the present disclosure. In contrast, when the first power switch SWA is switched OFF and the second power switch SWB is switched ON, the second power switch SWB and the fourth power switch SWD among the four power switches SWA, SWB, SWC and SWD are actually ON, and this situation is referred to as "BD" in the present disclosure. During a boost switching cycle, the control circuit 108 is configured to regulate the third power switch SWC and the fourth power switch SWD in the second switch pair to switch ON and OFF complementarily, and is further configured to regulate the first power switch SWA to remain ON and the second power switch SWB to remain OFF. Thus, during the boost switching cycle, when the third power switch SWC is switched ON and the fourth power switch SWD is switched OFF, the first power switch SWA and the third power switch SWC among the four power switches SWA, SWB, SWC and SWD are actually ON, and this situation is referred to as "AC" in the present disclosure. In contrast, when the third power switch SWC is switched OFF and the fourth power switch SWD is switched ON, the first power switch SWA and the fourth power switch SWD among the four power switches SWA, SWB, SWC and SWD are actually ON, and this situation is referred to as "AD" in the present disclosure.

In accordance with an exemplary embodiment of the present invention, the buck-boost power converter 100 is regulated to operate in the boost mode when the input voltage Vin is lower than the output voltage Vo. In the boost mode, the control circuit 108 is configured to regulate the second switch pair to conduct ON and OFF switching, and to regulate the first power switch SWA and the second power switch SWB in the first switch pair to respectively remain OFF and ON. In this situation, the buck-boost power converter 100 actually has a boost type topology. In an embodiment, in the boost mode, the control circuit 108 is configured to regulate the third power switch SWC and the fourth power switch SWD to switch ON and OFF complementarily, i.e. when the third power switch SWC is switched ON, the fourth power switch SWD is switched OFF, and vice versa. A fraction of an on time of the third power switch SWC to an entire switching cycle of the third power switch SWC and the fourth power switch SWD is referred to as a boost duty cycle, and is labeled by D2 in the present disclosure.

In accordance with an embodiment of the present invention, the control circuit 108 is configured to control the buck-boost power converter 100 to automatically transit smoothly between the buck mode and the buck-boost mode, and between the buck-boost mode and the boost mode.

The control circuit 108 can regulate the output voltage Vo through regulating the buck duty cycle D1 and the boost duty cycle D2. When using the peak current control pulse width modulation mode, the second feedback signal Vcs fed to the control circuit 108 may be obtained by sensing a switching current flowing through the first power switch SWA or by sensing an inductor current IL flowing through the inductive energy storage component Lo. Thus, the second feedback signal Vcs is proportional to the switching current $I_{HS}$ or to the inductor current IL and contain an information of a peak current value of the switching current $I_{HS}$ or of the inductor current IL. Since the output current Io can be considered as an average of the switching current $I_{HS}$ or of the inductor current IL. Thus, the second feedback signal Vcs obtained by sensing the switching current $I_{HS}$ or the inductor current IL is actually indicative of the output current Io.

In accordance with an embodiment of the present invention, the buck-boost power converter 100 may further comprise a capacitive energy storage component Co coupled between the output port OUT and the reference ground GND. The capacitive energy storage component Co is configured to filter the output signals from the switch module, e.g. to filter a first switching signal $V_{SW1}$ output at the first switching node SW1 and a second switching signal $V_{SW2}$ output at the second switching node SW2 so as to smooth the output voltage Vo.

In accordance with an embodiment of the present invention, the buck-boost power converter 100 may further comprise a feedback circuit coupled to the output port OUT and configured to detect the output voltage Vo so as to provide the first feedback signal Vfb. In FIG. 2, the feedback circuit is illustrated to comprise a first feedback resistor Rf1 and a second feedback resistor Rf2 connected in series between the output port OUT and the reference ground GND. The first feedback signal Vfb is provided from the common connection of the first feedback resistor Rf1 and the second feedback resistor Rf2. In other embodiments, the feedback circuit may comprise other circuit elements. In certain embodiment, the power converter 100 may not comprise the feedback circuit and the output voltage Vo may be provided as the feedback signal VFB.

In the following, more detailed descriptions will be provided to the buck-boost power converter 100 and the control circuit 108 with reference to FIG. 2 through FIG. 10.

In accordance with an embodiment of the present invention, the control circuit 108 of the buck-boost power converter 100 may comprise an operational amplifier 101 configured to receive the first feedback signal Vfb and the reference signal Vref respectively, and further configured to conduct operation to the first feedback signal Vfb and the reference signal Vref to provide an amplified difference signal Vcomp indicative of a difference between the first feedback signal Vfb and the reference signal Vref.

Figure 9:
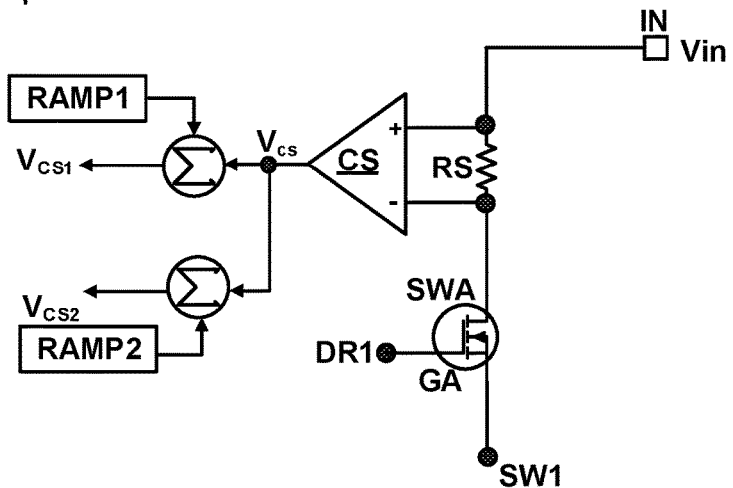
FIG. 9 illustrates a schematic diagram of a current sensing and compensation module 106 in accordance with an embodiment of the present invention.

The control circuit 108 may further comprise a current sensing and compensation module 106 configured to sense the switching current $I_{HS}$ or the inductor current IL to generate the second feedback signal Vcs, and further configured to compensate the second feedback signal Vcs by slope compensation scheme to generate a first current sensing signal $V_{CS1}$ and a second current sensing signal $V_{CS2}$. The first current sensing signal $V_{CS1}$ is indicative of the inductor current IL during the buck-boost power converter 100 is operated in the buck mode/buck cycle while the second current sensing signal $V_{CS2}$ is indicative of the inductor current IL during the buck-boost power converter 100 is operated in the boost mode/boost cycle. FIG. 9 illustrates a schematic diagram of a current sensing and compensation module 106 in accordance with an embodiment of the present invention. In this example, the current sensing and compensation module 106 is illustrated to generate the second feedback signal Vcs by sensing the switching current $I_{HS}$ flowing through the first power switch SWA. A current sensing resistor RS and a current sensing amplifier CS may be used to implement this function, as shown in FIG. 9, the current sensing resistor RS is coupled in series with the first power switch SWA, and a first input terminal and a second input terminal of the current sensing amplifier CS are respectively coupled to a first terminal and a second terminal of the current sensing resistor RS. The current sensing amplifier CS outputs the second feedback signal Vcs. One of ordinary skill in the art should understand that this is not intended to be limiting, other circuits/elements may be used to fulfill the current sensing function. The current sensing and compensation module 106 may further be configured to receive a first slope compensation signal RAMP1 and a second slope compensation signal RAMP2 to respectively compensate the second feedback signal Vcs.

Figure 10:
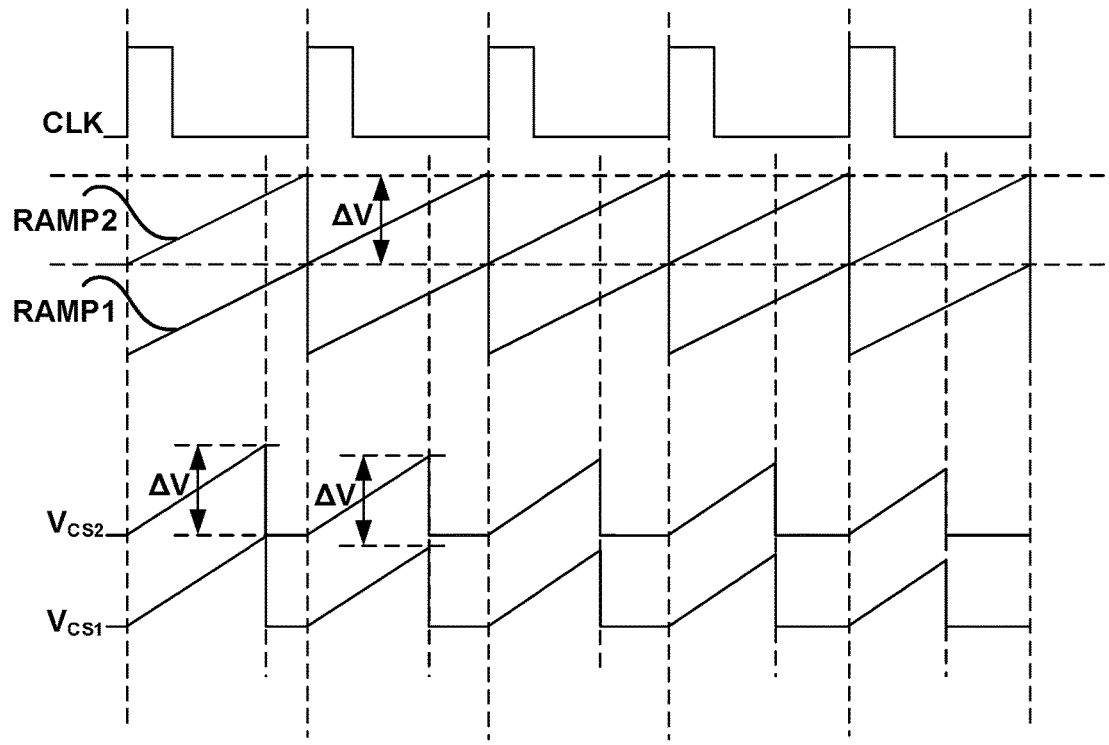
FIG. 10 illustrates a waveform diagram of the first ramp signal RAMP1, the second ramp signal RAMP2, the first current sensing signal $V_{CS1}$ and the second current sensing signal $V_{CS2}$ in accordance with an embodiment of the present invention.

In an embodiment as shown in FIG. 10, the second slope compensation signal RAMP2 may be generated by adding a predetermined bias voltage ΔV to the first slope compensation signal RAMP1 to make a peak value of the first slope compensation signal RAMP1 equal to a valley value of the second slope compensation signal RAMP2. The first slope compensation signal RAMP1 and the second slope compensation signal RAMP2 do not overlay with each other. In this case, the predetermined bias voltage ΔV may be considered as equal to the amplitude of the first slope compensation signal RAMP1. One of ordinary skill in the art should understand that the illustration of slope and amplitude in FIG. 10 are only for illustrative purpose and are not drawn to scale.

Turning back to FIG. 9, the current sensing and compensation module 106 is configured to compensate the second feedback signal Vcs respectively by the first slope compensation signal RAMP1 and the second slope compensation signal RAMP2 to respectively generate the first current sensing signal $V_{CS1}$ and the second current sensing signal $V_{CS2}$. In an embodiment, as shown in FIG. 9, the compensation may be realized by an adder, i.e. respectively adding the first slope compensation signal RAMP1 and the second slope compensation signal RAMP2 to the second feedback signal Vcs to respectively generate the first current sensing signal $V_{CS}$ and the second current sensing signal $V_{CS2}$. Thus, the second current sensing signal $V_{CS2}$ can also be considered as obtained by adding the predetermined bias voltage ΔV to the first current sensing signal $V_{CS1}$.

Turning back to FIG. 2, the control circuit 108 may further comprise a buck cycle pulse width modulation module 102 and a boost cycle pulse width modulation module 103. The buck cycle pulse width modulation module 102 is configured to respectively receive the amplified difference signal Vcomp and the first current sensing signal $V_{CS1}$, and to compare the first current sensing signal $V_{CS1}$ with the amplified difference signal Vcomp to generate a first pulse width modulation signal PWM1. The boost cycle pulse width modulation module 103 is configured to respectively receive the amplified difference signal Vcomp and the second current sensing signal $V_{CS2}$, and to compare the second current sensing signal $V_{CS2}$ with the amplified difference signal Vcomp to generate a second pulse width modulation signal PWM2.

The control circuit 108 may further comprise a logic control module 104. The logic control module 104 may be configured to at least receive the first pulse width modulation signal PWM1, the second pulse width modulation signal PWM2 and a clock signal CLK, and further be configured to provide the first control signal DR1, the second control signal DR2, the third control signal DR3 and the fourth control signal DR4 at least based on the first pulse width modulation signal PWM1, the second pulse width modulation signal PWM2 and the clock signal CLK. The clock signal CLK may be generated from an oscillator for example. In an embodiment, the first control signal DR1 and the second control signal DR2 may be logically complementary, i.e. when the first control signal DR1 has a high logic level, the second control signal DR2 has a low logic level, and vice versa. The first control signal DR1 and the second control signal DR2 are respectively configured to control the first power switch SWA and the second power switch SWB in the first switch pair. The third control signal DR3 and the fourth control signal DR4 may also be logically complementary, i.e. when the third control signal DR3 has a high logic level, the fourth control signal DR4 has a low logic level, and vice versa. The third control signal DR3 and the fourth control signal DR4 are respectively configured to control the third power switch SWC and the fourth power switch SWD in the second switch pair. In an embodiment, during the buck mode/buck cycle, the first pulse width modulation signal PWM1 is configured to trigger the first control signal DR1 to switch the first power switch SWA OFF, and the clock signal CLK is configured to trigger the first control signal DR1 to switch the first power switch SWA ON. During the boost mode/boost cycle, the second pulse width modulation signal PWM2 is configured to trigger the third control signal DR3 to switch the third power switch SWC OFF, and the clock signal CLK is configured to trigger the third control signal DR3 to switch the third power switch SWC ON.

The control circuit 108 may further comprise a mode transition control module 105. The mode transition control module 105 may be configured to sense the buck duty cycle D1 and the boost duty cycle D2 and to compare the sensed buck duty cycle D1 and the sensed boost duty cycle D2 respectively with a buck duty threshold $D_{TH1}$ and a boost duty threshold $D_{TH2}$ to respectively generate a first mode transition control signal TR1 and a second mode transition control signal TR2, which are configured to regulate the buck-boost power converter 100 to conduct mode transition. In an exemplary embodiment, when the buck duty cycle D1 is larger than the buck duty threshold $D_{TH1}$, the first mode transition control signal TR1 is configured to control the buck-boost power converter 100 to transit from the buck mode to the buck-boost mode, when the buck duty cycle D1 is smaller than the buck duty threshold $D_{TH1}$, the first mode transition control signal TR1 is configured to control the buck-boost power converter 100 to transit from the buck-boost mode to the buck mode. When the boost duty cycle D2 is larger than the boost duty threshold $D_{TH2}$, the second mode transition control signal TR2 is configured to control the buck-boost power converter 100 to transit from the buck-boost mode to the boost mode, when the boost duty cycle D2 is smaller than the boost duty threshold $D_{TH2}$, the second mode transition control signal TR2 is configured to control the buck-boost power converter 100 to transit from the boost mode to the buck-boost mode.

In accordance with an exemplary embodiment of the present invention, the control circuit 108 is configured to increase an ON time of the second power switch SWB and the fourth power switch SWD of the buck cycle, i.e., increase an ON time of the "BD" of the buck cycle when the buck-boost power converter 100 transits from the buck mode to the buck-boost mode. In an embodiment, increasing the ON time of the "BD" of the buck cycle may be implemented by regulating the buck duty cycle D1 through the buck cycle pulse width modulation module 102. Still referring the illustration of FIG. 2, the buck cycle pulse width modulation module 102 may comprise a first controllable hysteresis H1 and have a hysteresis control terminal which is configured to receive the first mode transition control signal TR1. When the buck-boost power converter 100 transits from the buck mode to the buck-boost mode, the buck cycle pulse width modulation module 102 is configured to enable the first controllable hysteresis H1 in response to the first mode transition control signal TR1. In this situation, it can be understood that the first controllable hysteresis H1 is added to the amplified difference signal Vcomp or to the first current sensing signal $V_{CS1}$ received by the buck cycle pulse width modulation module 102. Thus, when the first controllable hysteresis H1 is enabled, the buck cycle pulse width modulation module 102 is configured to compare the amplified difference signal Vcomp with the first current sensing signal $V_{CS1}$ plus the first controllable hysteresis H1 so as to decrease a pulse width of the first pulse width modulation signal PWM1, which is indicative of the buck duty cycle D1. In consequence, the ON time of the "BD" of the buck cycle can be increased in response to the decrease in the pulse width of the first pulse width modulation signal PWM1. One of ordinary skill in the art should understand that the first controllable hysteresis H1 can be appropriately chosen and set. For instance, the first controllable hysteresis H1 can be negative when added to the amplified difference signal Vcomp while it can be positive when added to the first current sensing signal $V_{CS1}$.

In accordance with an exemplary embodiment of the present invention, the control circuit 108 is configured to decrease the ON time of the second power switch SWB and the fourth power switch SWD of the buck cycle, i.e., decrease the ON time of the "BD" of the buck cycle when the buck-boost power converter 100 transits from the buck-boost mode to the buck mode. In an embodiment, decreasing the ON time of the "BD" of the buck cycle may still be implemented by regulating the buck duty cycle D1 through the buck cycle pulse width modulation module 102. Still referring the illustration of FIG. 2, the buck cycle pulse width modulation module 102 may be configured to disable the first controllable hysteresis H1 in response to the first mode transition control signal TR1 when the buck-boost power converter 100 transits from the buck-boost mode to the buck mode. In this situation, it can be understood that the first controllable hysteresis H1 is removed from the amplified difference signal Vcomp or the first current sensing signal $V_{CS1}$. Thus, when the first controllable hysteresis H1 is disabled, the buck cycle pulse width modulation module 102 is configured to compare the amplified difference signal Vcomp with the first current sensing signal $V_{CS1}$ and thus the pulse width of the first pulse width modulation signal PWM1 is increased compared to when the first controllable hysteresis H1 is enabled. In consequence, the ON time of the "BD" of the buck cycle can be decreased in response to the increase in the pulse width of the first pulse width modulation signal PWM1.

In accordance with an exemplary embodiment of the present invention, the control circuit 108 is configured to decrease an ON time of the first power switch SWA and the third power switch SWC of the boost cycle, i.e., decrease an ON time of the "AC" of the boost cycle when the buck-boost power converter 100 transits from the buck-boost mode to the boost mode. In an embodiment, decreasing the ON time of the "AC" of the boost cycle may be implemented by regulating the boost duty cycle D2 through the boost cycle pulse width modulation module 103. Still referring the illustration of FIG. 2, the boost cycle pulse width modulation module 103 may comprise a second controllable hysteresis H2 and have a hysteresis control terminal which is configured to receive the second mode transition control signal TR2. When the buck-boost power converter 100 transits from the buck-boost mode to the boost mode, the boost cycle pulse width modulation module 103 is configured to enable the second controllable hysteresis H2 in response to the second mode transition control signal TR2. In this situation, it can be understood that the second controllable hysteresis H2 is added to the amplified difference signal Vcomp or to the second current sensing signal $V_{CS2}$ received by the boost cycle pulse width modulation module 103. Thus, when the second controllable hysteresis H2 is enabled, the boost cycle pulse width modulation module 103 is configured to compare the amplified difference signal Vcomp with the second current sensing signal $V_{CS2}$ plus the second controllable hysteresis H2 so as to decrease a pulse width of the second pulse width modulation signal PWM2, which is indicative of the boost duty cycle D2. In consequence, the ON time of the "AC" of the boost cycle can be decreased in response to the decrease in the pulse width of the second pulse width modulation signal PWM2. One of ordinary skill in the art should understand that the second controllable hysteresis H2 can be appropriately chosen and set. For instance, the second controllable hysteresis H2 can be negative when added to the amplified difference signal Vcomp while it can be positive when added to the second current sensing signal $V_{CS2}$.

In accordance with an exemplary embodiment of the present invention, the control circuit 108 is configured to increase the ON time of the first power switch SWA and the third power switch SWC of the boost cycle, i.e., increase the ON time of the "AC" of the boost cycle when the buck-boost power converter 100 transits from the boost mode to the buck-boost mode. In an embodiment, increasing the ON time of the "AC" of the boost cycle may still be implemented by regulating the boost duty cycle D2 through the boost cycle pulse width modulation module 103. Still referring the illustration of FIG. 2, the boost cycle pulse width modulation module 103 may be configured to disable the second controllable hysteresis H2 in response to the second mode transition control signal TR2 when the buck-boost power converter 100 transits from the boost mode to the buck-boost mode. In this situation, it can be understood that the second controllable hysteresis H2 is removed from the amplified difference signal Vcomp or the second current sensing signal $V_{CS2}$. Thus, when the second controllable hysteresis H2 is disabled, the boost cycle pulse width modulation module 103 is configured to compare the amplified difference signal Vcomp with the second current sensing signal $V_{CS2}$ and thus the pulse width of the second pulse width modulation signal PWM2 is increased compared to when the second controllable hysteresis H2 is enabled. In consequence, the ON time of the "AC" of the boost cycle can be increased in response to the increase in the pulse width of the second pulse width modulation signal PWM2.

When the buck-boost power converter 100 transits from the buck mode to the buck-boost mode, the ON time of the "BD" of the buck cycle under the buck mode can no longer meet the requirement under the buck-boost mode and thus should be regulated to increase when enter into the buck-boost mode. In contrast, when the buck-boost power converter 100 transits from the buck-boost mode to the buck mode, the ON time of the "BD" of the buck cycle under the buck-boost mode excessive to the requirement under the buck mode and thus should be regulated to decrease when enter into the buck mode. The increment or decrement in the ON time of the "BD" of the buck cycle may be generally referred to as a variation in the ON time of the "BD" in the following. According to the various embodiments of the present invention, the buck cycle pulse width modulation module 102 is provided and can regulate the ON time of the "BD" of the buck cycle by simply regulating the first controllable hysteresis H1 during the buck-boost power converter 100 transits between the buck mode and the buck-boost mode. The variation in the ON time of the "BD" can be set by appropriately designing the value of the first controllable hysteresis H1 according to practical application requirements. With such a buck cycle pulse width modulation module 102, sparks in the output voltage Vo may be eliminated or at least greatly reduced during the buck-boost power converter 100 transits between the buck mode and the buck-boost mode, making the transitions smooth/seamless.

When the buck-boost power converter 100 transits from the buck-boost mode to the boost mode, the ON time of the "AC" of the boost cycle under the buck-boost mode is excessive to the requirement under the boost mode and thus should be regulated to decrease when entering into the boost mode. In contrast, when the buck-boost power converter 100 transits from the boost mode to the buck-boost mode, the ON time of the "AC" of the boost cycle under the boost mode can no longer meet the requirement under the buck-boost mode and thus should be regulated to increase when entering into the buck-boost mode. The increment or decrement in the ON time of the "AC" of the boost cycle may be generally referred to as a variation in the ON time of the "AC" in the following. According to the various embodiments of the present invention, the boost cycle pulse width modulation module 103 is provided and can regulate the ON time of the "AC" of the boost cycle by simply regulating the second controllable hysteresis H2 during the buck-boost power converter 100 transits between the buck-boost mode and the boost mode. The variation in the ON time of the "AC" can be set by appropriately designing the value of the second controllable hysteresis H2 according to practical application requirements. With such a boost cycle pulse width modulation module 103, sparks in the output voltage Vo may be eliminated or at least greatly reduced during the buck-boost power converter 100 transits between the buck-boost mode and the boost mode, making the transitions smooth/seamless.

Figure 3A:
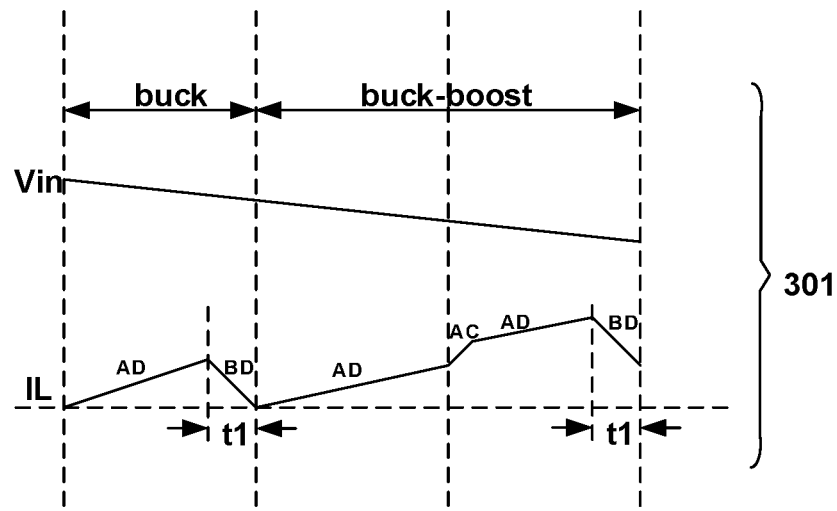
FIG. 3A illustrates a waveform diagram showing a first group of waveforms 301 including the waveform of the inductor current IL flowing through the inductive energy storage component Lo of a prior art buck-boost power converter when the prior art buck-boost power converter transits from buck mode to buck-boost mode.
Figure 3B:
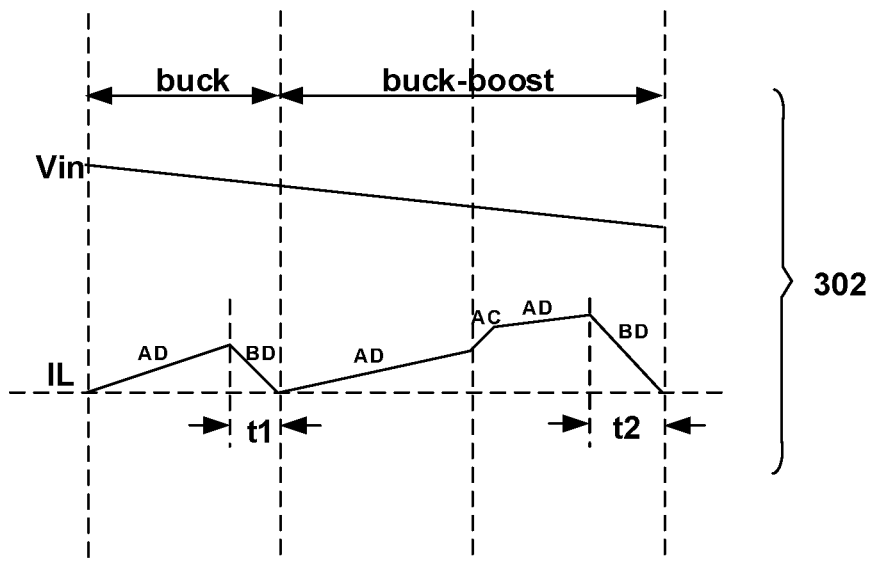
FIG. 3B illustrates a waveform diagram showing a second group of waveforms 302 including the waveform of the inductor current IL flowing through the inductive energy storage component Lo of a buck-boost power converter 100 in accordance with an embodiment of the present invention when the buck-boost power converter 100 transits from buck mode to buck-boost mode.

FIG. 3A illustrates a waveform diagram showing a first group of waveforms 301 including the waveform of the inductor current IL flowing through the inductive energy storage component Lo of a prior art buck-boost power converter when the prior art buck-boost power converter transits from buck mode to buck-boost mode. The first group of waveforms 301 is only illustrative and not drawn to scale of the inductor current IL of the prior art buck-boost power converter immediately before and after the transition from the buck mode to the buck-boost mode. In contrast, FIG. 3B illustrates a waveform diagram showing a second group of waveforms 302 including the waveform of the inductor current IL flowing through the inductive energy storage component Lo of a buck-boost power converter 100 in accordance with an embodiment of the present invention when the buck-boost power converter 100 transits from buck mode to buck-boost mode. The second group of waveforms 302 is only illustrative and not drawn to scale of the inductor current IL of the buck-boost power converter 100 immediately before and after the transition from the buck mode to the buck-boost mode. As shown in FIG. 3A, in the buck mode, with the input voltage Vin decreasing, the input voltage Vin is more and more close to the output voltage Vo until the buck duty cycle D1 reaches the buck duty threshold $D_{TH1}$, which indicates that the buck-boost power converter 100 may not be able to provide enough energy to the load should the buck-boost power converter 100 continues operating in the buck mode. Once the buck duty cycle D1 is increased to reach the buck duty threshold $D_{TH1}$, it indicates that the buck-boost power converter 100 needs to transit from the buck mode to the buck-boost mode to meet the energy supply required by the load. Thus, during the buck cycle immediately after the buck-boost power converter 100 has transited to the buck-boost mode, the first power switch SWA may need to be ON throughout the entire switching cycle (see the second "AD" segment of the inductor current IL waveform in the first group of waveforms 301). In the immediately subsequent boost cycle, the third power switch SWC and the fourth power switch SWD conduct one switching cycle of ON and OFF switching (see the third "AD" segment of the inductor current IL waveform in the first group of waveforms 301). Subsequently, following the boost cycle, the buck-boost power converter 100 should be operated in a buck cycle again to switch ON the second power switch SWB (see the second "BD" segment of the inductor current IL waveform in the first group of waveforms 301) so as to discharge the inductor current IL. However, should the ON time of the "BD" under the buck-boost mode remain the same as under the previous buck mode, for instance, illustrated in the first group of waveforms 301 as being kept to a first predetermined ON time t1, this ON time of the "BD" would not be sufficient for the inductor current IL being properly discharged to meet the volt-second balance principle. In this situation, sparks may occur in the output voltage Vo due to the accumulation of the inductor current IL cycle by cycle, which is unsafe for the buck-boost converter to operate and drive the load. In contrast, as shown in FIG. 3B, for the buck-boost power converter 100 in accordance with an embodiment of the present invention, when transiting from the buck mode to the buck-boost mode, the ON time of the "BD" will be increased from the first predetermined ON time t1 of the buck mode to a second predetermined ON time t2 of the buck-boost mode, wherein the second predetermined ON time t2 is larger than the first predetermined ON time t1 and can be appropriately chosen so that the inductor current IL can be properly discharged to meet the volt-second balance principle, as illustrated in the second group of waveforms 302. In this fashion, the buck-boost power converter 100 will be able to transit from the buck mode to the buck-boost mode safely and smoothly/seamlessly without causing overshoots in the output voltage Vo and then operate in the buck-boost mode stably.

Figure 4A:
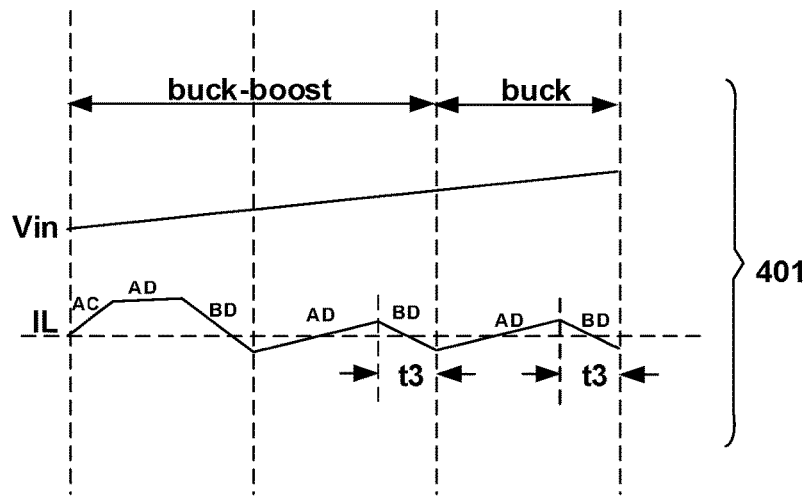
FIG. 4A illustrates a waveform diagram showing a first group of waveforms 301 including the waveform of the inductor current IL flowing through the inductive energy storage component Lo of a prior art buck-boost power converter when the prior art buck-boost power converter transits from buck-boost mode to buck mode.
Figure 4B:
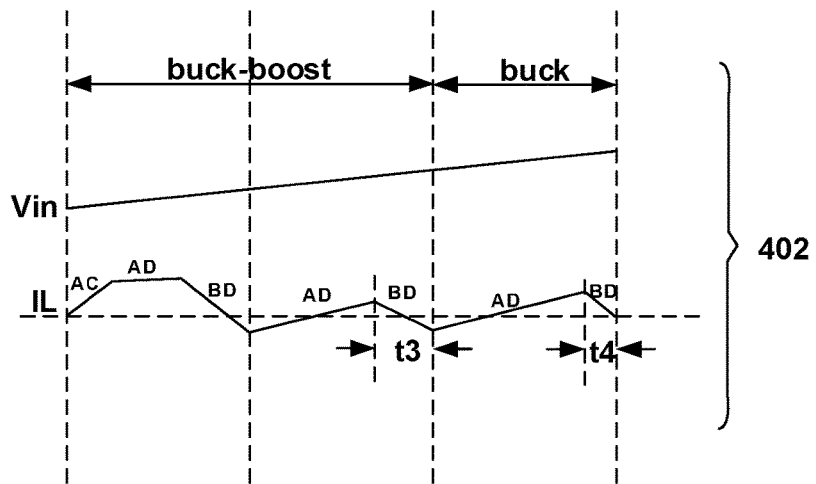
FIG. 4B illustrates a waveform diagram showing a second group of waveforms 402 including the waveform of the inductor current IL flowing through the inductive energy storage component Lo of a buck-boost power converter 100 in accordance with an embodiment of the present invention when the buck-boost power converter 100 transits from buck mode to buck-boost mode.
Figure 5:
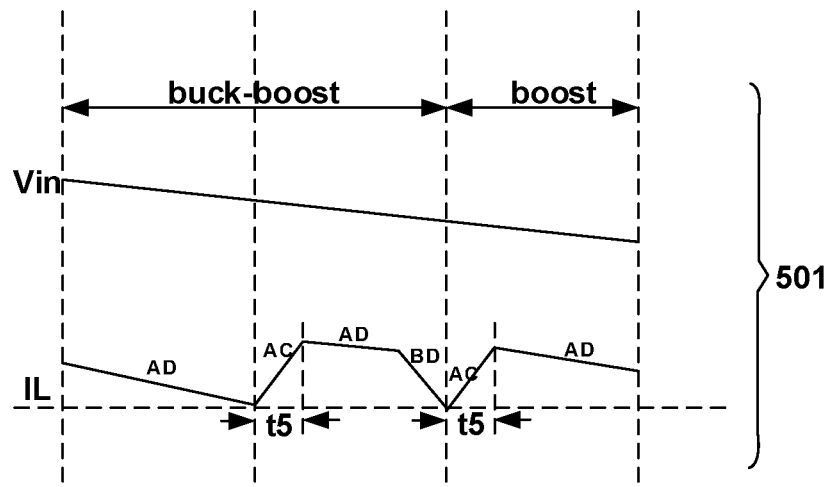
FIG. 5A illustrates a waveform diagram showing a first group of waveforms 501 including the waveform of the inductor current IL flowing through the inductive energy storage component Lo of a prior art buck-boost power converter i when the prior art buck-boost power converter transits from buck-boost mode to boost mode.
FIG. 5B illustrates a waveform diagram showing a second group of waveforms 502 including the waveform of the inductor current IL flowing through the inductive energy storage component Lo of a buck-boost power converter 100 in accordance with an embodiment of the present invention when the buck-boost power converter 100 transits from buck mode to buck-boost mode.
Figure 5:
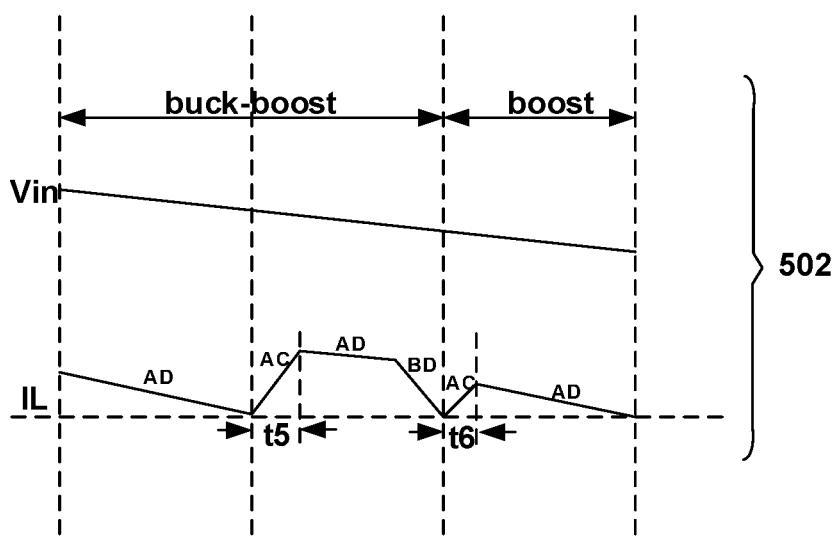
Figure 6:
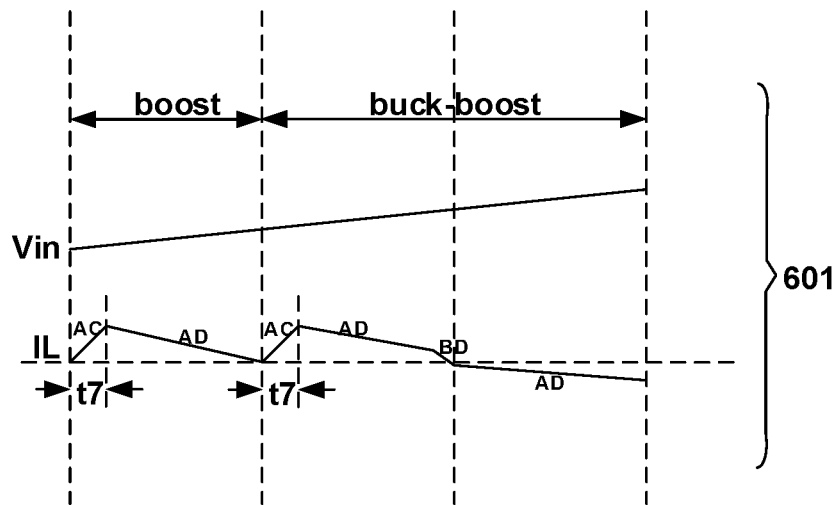
FIG. 6A illustrates a waveform diagram showing a first group of waveforms 501 including the waveform of the inductor current IL flowing through the inductive energy storage component Lo of a prior art buck-boost power converter when the prior art buck-boost power converter transits from boost mode to buck-boost mode.
FIG. 6B illustrates a waveform diagram showing a second group of waveforms 602 including the waveform of the inductor current IL flowing through the inductive energy storage component Lo of a buck-boost power converter 100 in accordance with an embodiment of the present invention when the buck-boost power converter 100 transits from buck mode to buck-boost mode.
Figure 6:
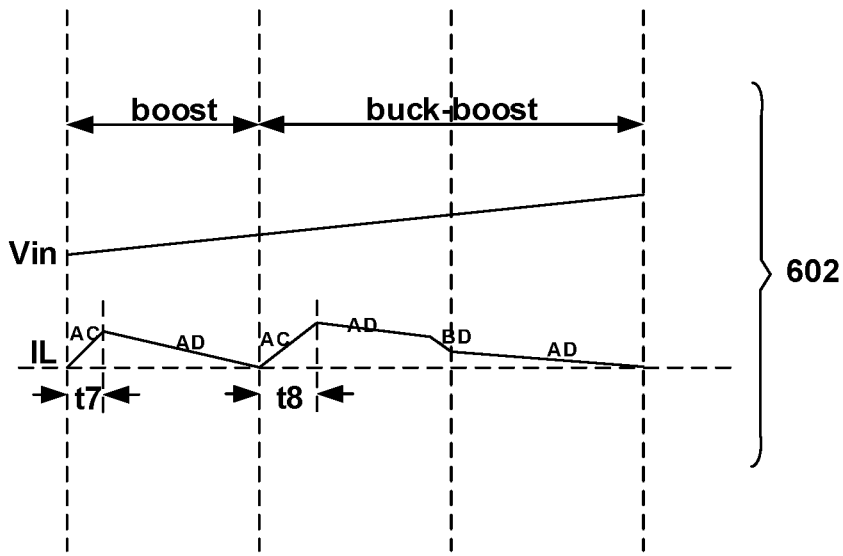

FIG. 4A illustrates a waveform diagram showing a first group of waveforms 301 including the waveform of the inductor current IL flowing through the inductive energy storage component Lo of a prior art buck-boost power converter when the prior art buck-boost power converter transits from buck-boost mode to buck mode. The first group of waveforms 401 is only illustrative and not drawn to scale of the inductor current IL of the prior art buck-boost power converter immediately before and after the transition from the buck-boost mode to the buck mode. In contrast, FIG. 4B illustrates a waveform diagram showing a second group of waveforms 402 including the waveform of the inductor current IL flowing through the inductive energy storage component Lo of a buck-boost power converter 100 in accordance with an embodiment of the present invention when the buck-boost power converter 100 transits from buck mode to buck-boost mode. The second group of waveforms 402 is only illustrative and not drawn to scale of the inductor current IL of the buck-boost power converter 100 immediately before and after the transition from the buck-boost mode to the buck mode. As shown in FIG. 4A, in the buck-boost mode, with the input voltage Vin increasing, the input voltage Vin becomes larger than the output voltage Vo until the buck duty cycle D1 falls to be smaller than the buck duty threshold $D_{TH1}$, which indicates that the energy provided by the buck-boost power converter to the load exceeds the requirement should the buck-boost power converter continues operating in the buck-boost mode. Once the buck duty cycle D1 is decreased to be smaller than the buck duty threshold $D_{TH1}$, it indicates that the buck-boost power converter needs to transit from the buck-boost mode to the buck mode to adjust the energy supplied to the load to match with the energy required by the load. However, should the ON time of the "BD" under the buck mode remain the same as under the buck-boost mode, for instance, illustrated in the first group of waveforms 401 as being kept to a third predetermined ON time t3, this ON time of the "BD" would be excessive resulting in the inductor current IL being over-discharged and unable to meet the volt-second balance principle. In this situation, undershoots may occur in the output voltage Vo due to the excessive decrease in the inductor current IL, which is unsafe for the buck-boost converter to operate and drive the load. In contrast, as shown in FIG. 4B, for the buck-boost power converter 100 in accordance with an embodiment of the present invention, when transiting from the buck-boost mode to the buck mode, the ON time of the "BD" will be decreased from the third predetermined ON time t3 of the buck mode to a fourth predetermined ON time t4 of the buck mode, wherein the fourth predetermined ON time t4 is smaller than the third predetermined ON time t3 and can be appropriately chosen so that the inductor current IL can be properly discharged to meet the volt-second balance principle, as illustrated in the second group of waveforms 402. In this fashion, the buck-boost power converter 100 will be able to transit from the buck-boost mode to the buck mode safely and smoothly/seamlessly without causing undershoots in the output voltage Vo and then operate in the buck mode stably.

FIG. 5A illustrates a waveform diagram showing a first group of waveforms 501 including the waveform of the inductor current IL flowing through the inductive energy storage component Lo of a prior art buck-boost power converter i when the prior art buck-boost power converter transits from buck-boost mode to boost mode. The first group of waveforms 501 is only illustrative and not drawn to scale of the inductor current IL of the prior art buck-boost power converter immediately before and after the transition from the buck-boost mode to the boost mode. In contrast, FIG. 5B illustrates a waveform diagram showing a second group of waveforms 502 including the waveform of the inductor current IL flowing through the inductive energy storage component Lo of a buck-boost power converter 100 in accordance with an embodiment of the present invention when the buck-boost power converter 100 transits from buck mode to buck-boost mode. The second group of waveforms 502 is only illustrative and not drawn to scale of the inductor current IL of the buck-boost power converter 100 immediately before and after the transition from the buck-boost mode to the boost mode. As shown in FIG. 5A, in the buck-boost mode, with the input voltage Vin decreasing further, the input voltage Vin becomes smaller than the output voltage Vo until the boost duty cycle D2 reaches the boost duty threshold $D_{TH2}$, which indicates that the buck-boost power converter may not be able to provide enough energy to the load should the buck-boost power converter continues operating in the buck-boost mode. Once the boost duty cycle D2 is increased to reach the boost duty threshold $D_{TH2}$, it indicates that the buck-boost power converter needs to transit from the buck-boost mode to the boost mode to meet the energy supply required by the load. However, should the ON time of the "AC" under the boost mode remain the same as under the previous buck-boost mode, for instance, illustrated in the first group of waveforms 501 as being kept to a fifth predetermined ON time t5, this ON time of the "AC" would be excessive resulting in the inductor current IL being over-charged because once the buck-boost power converter has transited to the boost mode, there are no more buck cycles and thus no more "BD" cycles (illustrated by the "BD" segments of the inductor current IL waveform in the first group of waveforms 501) to discharge the inductor current IL while only the "AD" cycles may not be sufficient to discharge the inductor current IL to meet the volt-second balance principle. In this situation, overshoots may occur in the output voltage Vo due to accumulation of the inductor current IL cycle by cycle, which is unsafe for the buck-boost converter to operate and drive the load. In contrast, as shown in FIG. 5B, for the buck-boost power converter 100 in accordance with an embodiment of the present invention, when transiting from the buck-boost mode to the boost mode, the ON time of the "AC" will be decreased from the fifth predetermined ON time t5 of the buck-boost mode to a sixth predetermined ON time t6 of the boost mode, wherein the sixth predetermined ON time t6 is smaller than the fifth predetermined ON time t5 and can be appropriately chosen so that the inductor current IL can be properly charged during the "AC" to match with the discharge during the "AD" so as to meet the volt-second balance principle, as illustrated in the second group of waveforms 502. In this fashion, the buck-boost power converter 100 will be able to transit from the buck-boost mode to the boost mode safely and smoothly/seamlessly without causing overshoots in the output voltage Vo and then operate in the boost mode stably.

FIG. 6A illustrates a waveform diagram showing a first group of waveforms 501 including the waveform of the inductor current IL flowing through the inductive energy storage component Lo of a prior art buck-boost power converter when the prior art buck-boost power converter transits from boost mode to buck-boost mode. The first group of waveforms 601 is only illustrative and not drawn to scale of the inductor current IL of the prior art buck-boost power converter immediately before and after the transition from the boost mode to the buck-boost mode. In contrast, FIG. 6B illustrates a waveform diagram showing a second group of waveforms 602 including the waveform of the inductor current IL flowing through the inductive energy storage component Lo of a buck-boost power converter 100 in accordance with an embodiment of the present invention when the buck-boost power converter 100 transits from buck mode to buck-boost mode. The second group of waveforms 602 is only illustrative and not drawn to scale of the inductor current IL of the buck-boost power converter 100 immediately before and after the transition from the boost mode to the buck-boost mode. As shown in FIG. 6A, in the boost mode, with the input voltage Vin increasing further, the input voltage Vin becomes more and more close to the output voltage Vo until the boost duty cycle D2 falls to be smaller than the boost duty threshold $D_{TH2}$, which indicates that the energy provided by the buck-boost power converter to the load exceeds the requirement should the buck-boost power converter continues operating in the boost mode. Once the boost duty cycle D2 is decreased to be smaller than the boost duty threshold $D_{TH2}$, it indicates that the buck-boost power converter needs to transit from the boost mode to the buck-boost mode to adjust the energy supplied to the load to match with the energy required by the load. However, should the ON time of the "AC" under the buck-boost mode remain the same as under the previous boost mode, for instance, illustrated in the first group of waveforms 601 as being kept to a seventh predetermined ON time t7, this ON time of the "AC" would be not be sufficient for charging the inductor current IL because once the buck-boost power converter has transited to the buck-boost mode, buck cycles enter and thus the "AD" and "BD" cycles of the buck cycles discharge the inductor current IL together with the "AD" cycles of the boost cycles resulting in the inductor current IL being over-discharged and unable to meet the volt-second balance principle. In this situation, undershoots may occur in the output voltage Vo due to the excessive decrease in the inductor current IL, which is unsafe for the buck-boost converter to operate and drive the load. In contrast, as shown in FIG. 6B, for the buck-boost power converter 100 in accordance with an embodiment of the present invention, when transiting from the boost mode to the buck-boost mode, the ON time of the "AC" will be increased from the seventh predetermined ON time t7 of the boost mode to an eighth predetermined ON time t8 of the buck-boost mode, wherein the seventh predetermined ON time t7 is smaller than the eighth predetermined ON time t8 and can be appropriately chosen so that the inductor current IL can be properly charged during the "AC" to match with the discharge during the "AD" and "BD" so as to meet the volt-second balance principle, as illustrated in the second group of waveforms 602. In this fashion, the buck-boost power converter 100 will be able to transit from the boost mode to the buck-boost mode safely and smoothly/seamlessly without causing undershoots in the output voltage Vo and then operate in the buck-boost mode stably.

Figure 7:
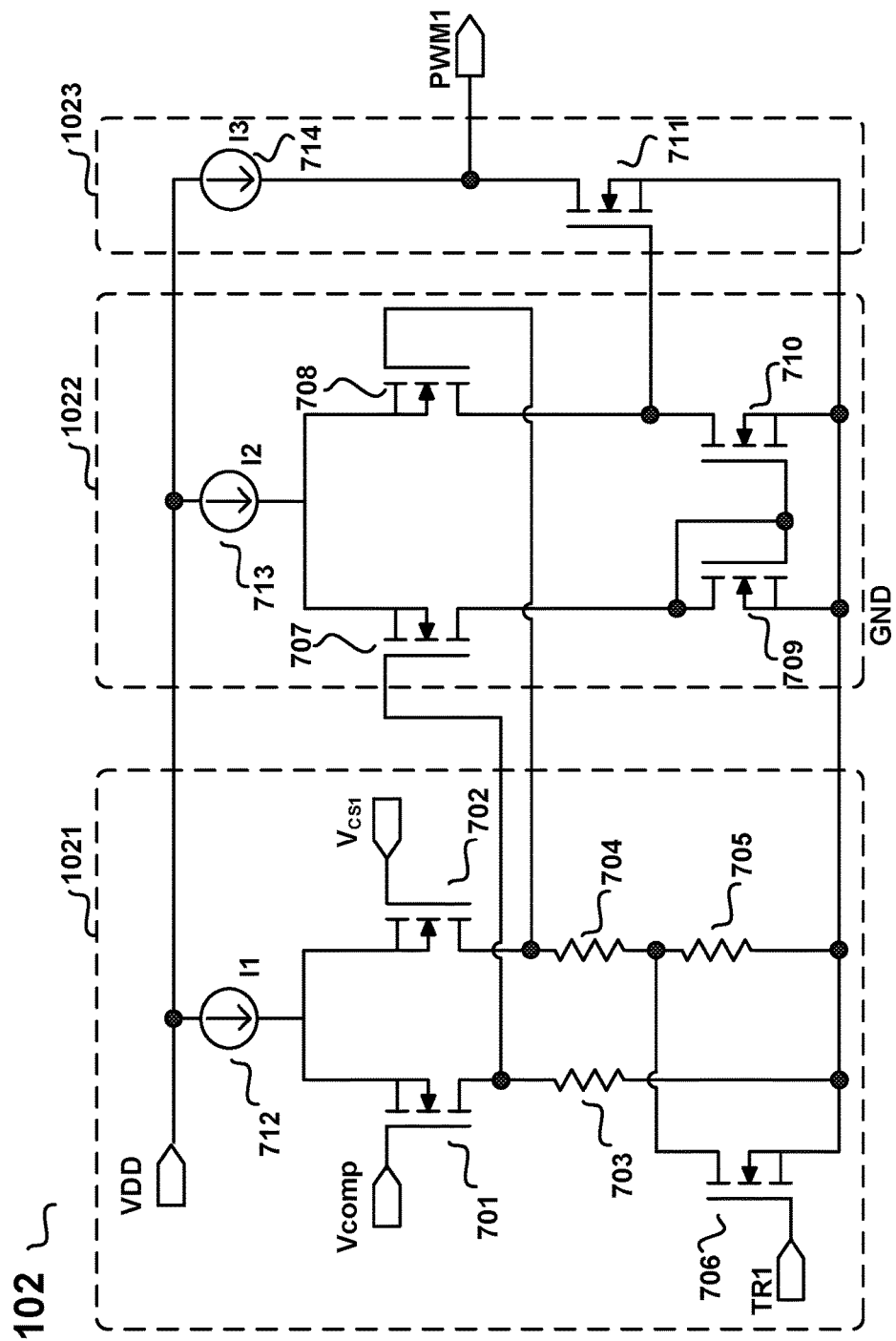
FIG. 7 illustrates a schematic diagram of a buck cycle pulse width modulation module 102 in accordance with an embodiment of the present invention.

FIG. 7 illustrates a schematic diagram of a buck cycle pulse width modulation module 102 in accordance with an embodiment of the present invention. The buck cycle pulse width modulation module 102 in the example of FIG. 7 is illustrated to comprise a first hysteresis comparison circuit having the first controllable hysteresis H1. The first hysteresis comparison circuit may comprise, for instance, a first differential input stage 1021, a first differential amplifying stage 1022 and a first output stage 1023 and may be supplied by an internal supply voltage VDD. The first differential input stage 1021 may comprise a first transistor 701, a second transistor 702, a third transistor 706, a first resistor 703, a second resistor 704, a third resistor 705 and a first current source 712. Each of the first transistor 701, the second transistor 702 and the third transistor 706 may have a first terminal, a second terminal and a control terminal. The first transistor 701 and the second transistor 702 form a differential input pair, wherein the first terminals of both the first transistor 701 and the second transistor 702 are coupled to the first current source 712 to receive a first current I1, the control terminal of the first transistor 701 is configured to receive the amplified difference signal Vcomp while the control terminal of the second transistor 702 is configured to receive the first current sensing signal $V_{CS1}$, and the second terminal of the first transistor 701 is coupled to a first terminal of the first resistor 703 while the second terminal of the second transistor 702 is coupled to a first terminal of the second resistor 704. A second terminal of the first resistor 703 is connected to the reference ground GND. A first terminal of the third resistor 705 is coupled to a second terminal of the second resistor 704 and a second terminal of the third resistor 705 is coupled to the reference ground GND. The first terminal of the third transistor 706 is coupled to the second terminal of the second transistor 702, the second terminal of the third transistor 706 is coupled to the reference ground GND and the control terminal of the third transistor 706 is configured to receive the first mode transition control signal TR1. In this exemplary configuration the third transistor 706 and the third resistor 705 are coupled in parallel between the second terminal of the second transistor 702 and the reference ground GND and may be used to control the enable and disable switching of the first controllable hysteresis H1. The value of the first controllable hysteresis H1 may be regulated by adjusting the third resistor 705. When the buck-boost power converter 100 transiting from the buck mode to the buck-boost mode, the first mode transition control signal TR1 is configured to turn the third transistor 706 ON and thus shortcut the third resistor 705 to enable the first controllable hysteresis H1, increasing the ON time of the "BD". When the buck-boost power converter 100 transiting from the buck-boost mode to the buck mode, the first mode transition control signal TR1 is configured to turn the third transistor 706 OFF and thus let the third resistor 705 coupled in series with the second transistor 704 to disable the first controllable hysteresis H1, decreasing the ON time of the "BD".

The first differential amplifying stage 1022 may comprise a fourth transistor 707, a fifth transistor 708, a sixth transistor 709 and a seventh transistor 710, each having a first terminal, a second terminal and a control terminal. The first differential amplifying stage 1022 may further comprise a second current source 712. The fourth transistor 707 and the fifth transistor 708 form a differential pair, wherein the first terminals of both the fourth transistor 707 and the fifth transistor 708 are coupled to the second current source 712 to receive a second current I2, the control terminal of the fourth transistor 707 is coupled to the second terminal of the first transistor 701 while the control terminal of the fifth transistor 708 is coupled to the second terminal of the second transistor 702, and the second terminal of the fourth transistor 707 is coupled to the first terminal of the sixth transistor 709 while the second terminal of the fifth transistor 708 is coupled to the first terminal of the seventh transistor 710. The first terminal of the sixth transistor 709 is further coupled to the control terminal of itself and the control terminal of the seventh transistor 710, and the second terminals of both the sixth transistor 709 and the seventh transistor 710 are coupled to the reference ground GND so that the sixth transistor 709 and the seventh transistor 710 form a current mirror.

The first output stage 1023 may comprise an eighth transistor 711 and a third current source 714. The eighth transistor 711 have a first terminal coupled to the third current source 714 to receive a third current I3, a second terminal coupled to the reference ground GND and a control terminal coupled to the second terminal of the fifth transistor 708. The first terminal of the eighth transistor 711 is configured to function as an output terminal of the buck cycle pulse width modulation module 102 and to provide the first pulse width modulation signal PWM1.

Figure 8:
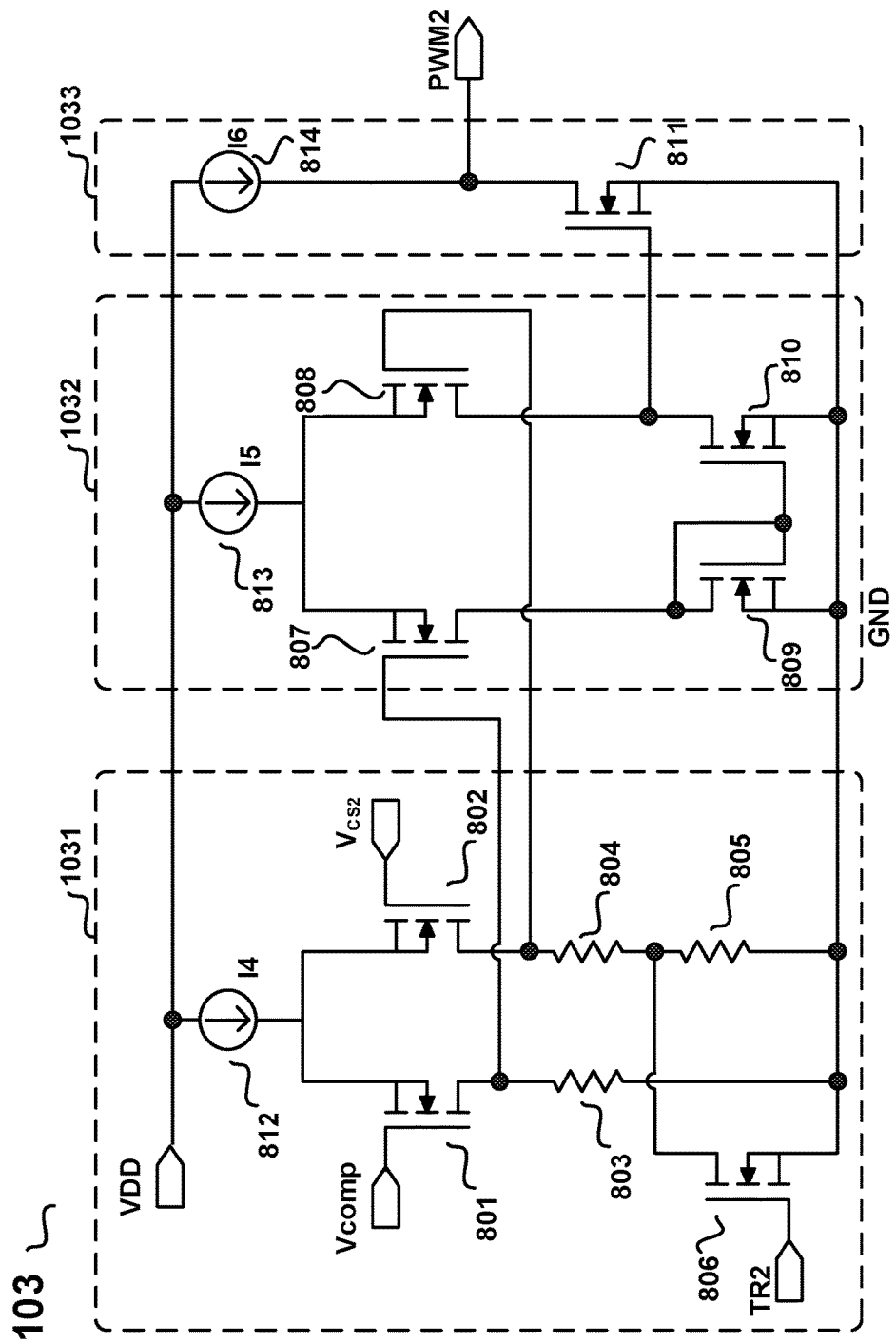
FIG. 8 illustrates a schematic diagram of a boost cycle pulse width modulation module 103 in accordance with an embodiment of the present invention.

FIG. 8 illustrates a schematic diagram of a boost cycle pulse width modulation module 103 in accordance with an embodiment of the present invention. The boost cycle pulse width modulation module 103 in the example of FIG. 8 is illustrated to comprise a second hysteresis comparison circuit having the second controllable hysteresis H2. The second hysteresis comparison circuit may comprise, for instance, a second differential input stage 1031, a second differential amplifying stage 1032 and a second output stage 1033 and may be supplied by an internal supply voltage VDD. The second differential input stage 1031 may comprise a ninth transistor 801, a tenth transistor 802, an eleventh transistor 806, a fourth resistor 803, a fifth resistor 804, a sixth resistor 805 and a fourth current source 812. Each of the ninth transistor 801, the tenth transistor 802 and the eleventh transistor 806 may have a first terminal, a second terminal and a control terminal. The ninth transistor 801 and the tenth transistor 802 form a differential input pair, wherein the first terminals of both the ninth transistor 801 and the tenth transistor 802 are coupled to the fourth current source 812 to receive a fourth current I4, the control terminal of the ninth transistor 801 is configured to receive the amplified difference signal Vcomp while the control terminal of the tenth transistor 802 is configured to receive the second current sensing signal $V_{CS2}$, and the second terminal of the ninth transistor 801 is coupled to a first terminal of the fourth resistor 803 while the second terminal of the tenth transistor 802 is coupled to a first terminal of the fifth resistor 804. A second terminal of the fourth resistor 803 is connected to the reference ground GND. A first terminal of the sixth resistor 805 is coupled to a second terminal of the fifth resistor 804 and a second terminal of the sixth resistor 805 is connected to the reference ground GND. The first terminal of the eleventh transistor 806 is coupled to the second terminal of the tenth transistor 802, the second terminal of the eleventh transistor 806 is coupled to the reference ground GND and the control terminal of the eleventh transistor 806 is configured to receive the second mode transition control signal TR2. In this exemplary configuration the eleventh transistor 806 and the sixth resistor 805 are coupled in parallel between the second terminal of the tenth transistor 802 and the reference ground GND and may be used to control the enable and disable switching of the second controllable hysteresis H2. The value of the second controllable hysteresis H2 may be regulated by adjusting the sixth resistor 805. When the buck-boost power converter 100 transiting from the buck-boost mode to the boost mode, the second mode transition control signal TR2 is configured to turn the eleventh transistor 806 ON and thus shortcut the sixth resistor 805 to enable the second controllable hysteresis H2, decreasing the ON time of the "AC". When the buck-boost power converter 100 transiting from the boost mode to the buck-boost mode, the second mode transition control signal TR2 is configured to turn the eleventh transistor 806 OFF and thus let the sixth resistor 805 coupled in series with the fifth transistor 804 to disable the second controllable hysteresis H2, increasing the ON time of the "AC".

The second differential amplifying stage 1032 may comprise a twelfth transistor 807, a thirteenth transistor 808, a fourteenth transistor 809 and a fifteenth transistor 810, each having a first terminal, a second terminal and a control terminal. The second differential amplifying stage 1032 may further comprise a fifth current source 812. The twelfth transistor 807 and the thirteenth transistor 808 form a differential pair, wherein the first terminals of both the twelfth transistor 807 and the thirteenth transistor 808 are coupled to the fifth current source 812 to receive a fifth current I5, the control terminal of the twelfth transistor 807 is coupled to the second terminal of the ninth transistor 801 while the control terminal of the thirteenth transistor 808 is coupled to the second terminal of the tenth transistor 802, and the second terminal of the twelfth transistor 807 is coupled to the first terminal of the fourteenth transistor 809 while the second terminal of the thirteenth transistor 808 is coupled to the first terminal of the seventh transistor 710. The first terminal of the fourteenth transistor 809 is further coupled to the control terminal of itself and the control terminal of the fifteenth transistor 810, and the second terminals of both the fourteenth transistor 809 and the fifteenth transistor 810 are coupled to the reference ground GND so that the fourteenth transistor 809 and the fifteenth transistor 810 form a current mirror.

The second output stage 1033 may comprise a sixteenth transistor 811 and a sixth current source 814. The sixteenth transistor 811 have a first terminal coupled to the sixth current source 814 to receive a sixth current I6, a second terminal coupled to the reference ground GND and a control terminal coupled to the second terminal of the thirteenth transistor 808. The first terminal of the sixteenth transistor 811 is configured to function as an output terminal of the boost cycle pulse width modulation module 103 and to provide the second pulse width modulation signal PWM2.

The above descriptions to the buck cycle pulse width modulation module 102 and the boost cycle pulse width modulation module 103 with reference to FIG. 7 to FIG. 8 are exemplary and not intended too be limiting. One of ordinary skill in the art should understand that the buck cycle pulse width modulation module 102 and the boost cycle pulse width modulation module 103 may have many other implementation structures, various modifications and variations can be made to the buck cycle pulse width modulation module 102 and the boost cycle pulse width modulation module 103 provided in the present disclosure. For instance, any hysteresis comparison circuit having controllable hysteresis may be used to implement the buck cycle pulse width modulation module 102 and the boost cycle pulse width modulation module 103

The advantages of the various embodiments of the buck-boost power converter 100, the control circuit 108 and the buck cycle pulse width modulation module 102 and the boost cycle pulse width modulation module 103 are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

What is claimed is:

1. A control circuit for regulating a buck-boost power converter, comprising:
   an operational amplifier configured to receive a first feedback signal indicative of an output voltage of the buck-boost power converter and a reference signal, and further configured to conduct operation to the first feedback signal and the reference signal to provide an amplified difference signal indicative of a difference between the first feedback signal and the reference signal;
   a buck cycle pulse width modulation module configured to respectively receive the amplified difference signal and a first current sensing signal indicative of a switching current during a buck cycle of the buck-boost power converter, and to compare the first current sensing signal with the amplified difference signal to generate a first pulse width modulation signal for regulating a buck duty cycle of the buck-boost power converter, wherein the buck cycle pulse width modulation module has a first controllable hysteresis and a hysteresis control terminal which is configured to receive a first mode transition control signal that controls the buck-boost power converter to transit between a buck mode and a buck-boost mode as well as controls the buck cycle pulse width modulation module to enable or disable the first controllable hysteresis, and wherein the buck cycle pulse width modulation module is further configured to enable the first controllable hysteresis in response to the first mode transition control signal when the buck-boost power converter transits from the buck mode to the buck-boost mode, and to disable the first controllable hysteresis in response to the first mode transition control signal when the buck-boost power converter transits from the buck-boost mode to the buck mode; and
   a boost cycle pulse width modulation module configured to respectively receive the amplified difference signal and a second current sensing signal indicative of a switching current during a boost cycle of the buck-boost power converter, and to compare the second current sensing signal with the amplified difference signal to generate a second pulse width modulation signal for regulating a boost duty cycle of the buck-boost power converter, wherein the boost cycle pulse width modulation module has a second controllable hysteresis and a hysteresis control terminal which is configured to receive a second mode transition control signal that controls the buck-boost power converter to transit between the buck-boost mode and a boost mode as well as controls the boost cycle pulse width modulation module to enable or disable the second controllable hysteresis, and wherein the boost cycle pulse width modulation module is further configured to enable the second controllable hysteresis in response to the second mode transition control signal when the buck-boost power converter transits from the buck-boost mode to the boost mode, and to disable the second controllable hysteresis in response to the second mode transition control signal when the buck-boost power converter transits from the boost mode to the buck-boost mode.

2. The control circuit of claim 1, wherein
when the first controllable hysteresis is enabled, the buck cycle pulse width modulation module is configured to add the first controllable hysteresis to the amplified difference signal or to the first current sensing signal, and to compare the amplified difference signal with the first current sensing signal plus the first controllable hysteresis to decrease a pulse width of the first pulse width modulation signal; and wherein
when the first controllable hysteresis is disabled, the buck cycle pulse width modulation module is configured to remove the first controllable hysteresis from the amplified difference signal or the first current sensing signal to increase a pulse width of the first pulse width modulation signal.

3. The control circuit of claim 2, wherein the control circuit is further configured to control a first power switch and a second power switch coupled in series between an input port of the buck-boost power converter and a reference ground, and a third power switch and a fourth power switch coupled in series between an output port of the buck-boost power converter and the reference ground, and wherein
the control circuit is further configured to increase an ON time of the second power switch and the fourth power switch in response to the decrease in the pulse width of the first pulse width modulation signal and to decrease the ON time of the second power switch and the fourth power switch in response to the increase in the pulse width of the first pulse width modulation signal, wherein an increment or a decrement in the ON time of the second power switch and the fourth power switch is set by designing a hysteresis value of the first controllable hysteresis.

4. The control circuit of claim 1, wherein
when the second controllable hysteresis is enabled, the boost cycle pulse width modulation module is configured to add the second controllable hysteresis to the amplified difference signal or to the second current sensing signal, and to compare the amplified difference signal with the second current sensing signal plus the second controllable hysteresis to decrease a pulse width of the second pulse width modulation signal; and wherein when the second controllable hysteresis is disabled, the boost cycle pulse width modulation module is configured to remove the second controllable hysteresis from the amplified difference signal or the second current sensing signal to increase a pulse width of the second pulse width modulation signal.

5. The control circuit of claim 4, wherein the control circuit is further configured to control a first power switch and a second power switch coupled in series between an input port of the buck-boost power converter and a reference ground, and a third power switch and a fourth power switch coupled in series between an output port of the buck-boost power converter and the reference ground, and wherein
the control circuit is further configured to decrease an ON time of the first power switch and the third power switch in response to the decrease in the pulse width of the second pulse width modulation signal and to increase the ON time of the first power switch and the third power switch in response to the increase in the pulse width of the second pulse width modulation signal, wherein an increment or a decrement in the ON time of the first power switch and the third power switch is set by designing a hysteresis value of the second controllable hysteresis.

6. The control circuit of claim 1, wherein the buck cycle pulse width modulation module comprises a first hysteresis comparison circuit having the first controllable hysteresis, and wherein the boost cycle pulse width modulation module comprises a second hysteresis comparison circuit having the second controllable hysteresis.

7. The control circuit of claim 6, wherein the first hysteresis comparison circuit comprises:
a first differential input stage comprising a first transistor, a second transistor, a third transistor, a first resistor, a second resistor, a third resistor and a first current source, wherein each of the first transistor, the second transistor and the third transistor has a first terminal, a second terminal and a control terminal, and wherein the first terminals of both the first transistor and the second transistor are coupled to the first current source to receive a first current, the control terminal of the first transistor is configured to receive the amplified difference signal while the control terminal of the second transistor is configured to receive the first current sensing signal, and the second terminal of the first transistor is coupled to a first terminal of the first resistor while the second terminal of the second transistor is coupled to a first terminal of the second resistor, and wherein a second terminal of the first resistor is coupled to the reference ground, and wherein a first terminal of the third resistor is coupled to a second terminal of the second resistor and a second terminal of the third resistor is coupled to the reference ground, and wherein the first terminal of the third transistor is coupled to the second terminal of the second transistor, the second terminal of the third transistor is coupled to the reference ground and the control terminal of the third transistor is configured to receive the first mode transition control signal which is configured to turn the third transistor ON when the buck-boost power converter transits from the buck mode to the buck-boost mode and to turn the third transistor OFF when the buck-boost power converter transits from the buck-boost mode to the buck mode;
a first differential amplifying stage comprising a fourth transistor, a fifth transistor, a sixth transistor and a seventh transistor, each having a first terminal, a second terminal and a control terminal, wherein the first terminals of both the fourth transistor and the fifth transistor are coupled to a second current source to receive a second current, the control terminal of the fourth transistor is coupled to the second terminal of the first transistor while the control terminal of the fifth transistor is coupled to the second terminal of the second transistor, and the second terminal of the fourth transistor is coupled to the first terminal of the sixth transistor while the second terminal of the fifth transistor is coupled to the first terminal of the seventh transistor, and wherein the first terminal of the sixth transistor is further coupled to the control terminal of itself and the control terminal of the seventh transistor, and the second terminals of both the sixth transistor and the seventh transistor are coupled to the reference ground; and a first output stage comprising an eighth transistor having a first terminal coupled to a third current source to receive a third current, a second terminal coupled to the reference ground and a control terminal coupled to the second terminal of the fifth transistor, wherein the first terminal of the eighth transistor is configured to function as an output terminal of the buck cycle pulse width modulation module to provide the first pulse width modulation signal.

8. The control circuit of claim 7, wherein the hysteresis value of the first controllable hysteresis is regulated by adjusting the third resistor.

9. The control circuit of claim 6, wherein the second hysteresis comparison circuit comprises:

a second differential input stage comprising a ninth transistor, a tenth transistor, an eleventh transistor, a fourth resistor, a fifth resistor, a sixth resistor and a fourth current source, wherein each of the ninth transistor, the tenth transistor and the eleventh transistor has a first terminal, a second terminal and a control terminal, and wherein the first terminals of both the ninth transistor and the tenth transistor are coupled to the fourth current source to receive a fourth current, the control terminal of the ninth transistor is configured to receive the amplified difference signal while the control terminal of the tenth transistor is configured to receive the second current sensing signal, and the second terminal of the ninth transistor is coupled to a first terminal of the fourth resistor while the second terminal of the tenth transistor is coupled to a first terminal of the fifth resistor, and wherein a second terminal of the fourth resistor is coupled to the reference ground, and wherein a first terminal of the sixth resistor is coupled to a second terminal of the fifth resistor and a second terminal of the sixth resistor is coupled to the reference ground, and wherein the first terminal of the eleventh transistor is coupled to the second terminal of the tenth transistor, the second terminal of the eleventh transistor is coupled to the reference ground and the control terminal of the eleventh transistor is configured to receive the second mode transition control signal which is configured to turn the eleventh transistor ON when the buck-boost power converter transits from the buck-boost mode to the boost mode and to turn the eleventh transistor OFF when the buck-boost power converter transits from the boost mode to the buck-boost mode;

a second differential amplifying stage comprising a twelfth transistor, a thirteenth transistor, a fourteenth transistor and a fifteenth transistor, each having a first terminal, a second terminal and a control terminal, wherein the first terminals of both the twelfth transistor and the thirteenth transistor are coupled to a fifth current source to receive a fifth current, the control terminal of the twelfth transistor is coupled to the second terminal of the ninth transistor while the control terminal of the thirteenth transistor is coupled to the second terminal of the tenth transistor, and the second terminal of the twelfth transistor is coupled to the first terminal of the fourteenth transistor while the second terminal of the thirteenth transistor is coupled to the first terminal of the seventh transistor, and wherein the first terminal of the fourteenth transistor is further coupled to the control terminal of itself and the control terminal of the fifteenth transistor, and the second terminals of both the fourteenth transistor and the fifteenth transistor are coupled to the reference ground; and a second output stage comprising a sixteenth transistor having a first terminal coupled to a sixth current source to receive a sixth current, a second terminal coupled to the reference ground and a control terminal coupled to the second terminal of the thirteenth transistor, wherein the first terminal of the sixteenth transistor is configured to function as an output terminal of the boost cycle pulse width modulation module to provide the second pulse width modulation signal.

10. The control circuit of claim 9, wherein the hysteresis value of the second controllable hysteresis is regulated by adjusting the sixth resistor.

11. The control circuit of claim 1, further comprising:

a mode transition control module configured to sense the buck duty cycle and the boost duty cycle and to compare the sensed buck duty cycle and the sensed boost duty cycle respectively with a buck duty threshold and a boost duty threshold to respectively generate the first mode transition control signal and the second mode transition control signal.

12. The control circuit of claim 7, wherein when the buck duty cycle is larger than the buck duty threshold, the first mode transition control signal is configured to control the buck-boost power converter to transit from the buck mode to the buck-boost mode, when the buck duty cycle is smaller than the buck duty threshold, the first mode transition control signal is configured to control the buck-boost power converter to transit from the buck-boost mode to the buck mode when the boost duty cycle is larger than the boost duty threshold, the second mode transition control signal is configured to control the buck-boost power converter to transit from the buck-boost mode to the boost mode, when the boost duty cycle is smaller than the boost duty threshold, the second mode transition control signal is configured to control the buck-boost power converter to transit from the boost mode to the buck-boost mode.

13. The control circuit of claim 1, further comprising:

a current sensing and compensation module configured to sense the switching current to generate the second feedback signal, and further configured to compensate the second feedback signal by respectively adding a first slope compensation signal and a second slope compensation signal to the second feedback signal to respectively generate a first current sensing signal and a second current sensing signal, wherein the second slope compensation signal is generated by adding a predetermined bias voltage to the first slope compensation signal to make a peak value of the first slope compensation signal equal to a valley value of the second slope compensation signal.

14. A buck-boost power converter comprising:
a switch module including a first power switch and a second power switch coupled in series between an input port and a reference ground, and a third power switch and a fourth power switch coupled in series between an output port and the reference ground; and
a control circuit configured to control the switch module, wherein the control circuit comprising
an operational amplifier configured to receive a first feedback signal indicative of an output voltage of the buck-boost power converter and a reference signal, and further configured to conduct operation to the first feedback signal and the reference signal to provide an amplified difference signal indicative of a difference between the first feedback signal and the reference signal;
a buck cycle pulse width modulation module configured to respectively receive the amplified difference signal and a first current sensing signal indicative of a switching current flowing through the switch module during a buck cycle, and to compare the first current sensing signal with the amplified difference signal to generate a first pulse width modulation signal for regulating a buck duty cycle of the buck-boost power converter, wherein the buck cycle pulse width modulation module has a first controllable hysteresis and a hysteresis control terminal which is configured to receive a first mode transition control signal that controls the buck-boost power converter to transit between a buck mode and a buck-boost mode as well as controls the buck cycle pulse width modulation module to enable or disable the first controllable hysteresis, and wherein the buck cycle pulse width modulation module is further configured to enable the first controllable hysteresis in response to the first mode transition control signal when the buck-boost power converter transits from the buck mode to the buck-boost mode, and to disable the first controllable hysteresis in response to the first mode transition control signal when the buck-boost power converter transits from the buck-boost mode to the buck mode; and
a boost cycle pulse width modulation module configured to respectively receive the amplified difference signal and a second current sensing signal indicative of a switching current flowing through the switch module during a boost cycle of the buck-boost power converter, and to compare the second current sensing signal with the amplified difference signal to generate a second pulse width modulation signal for regulating a boost duty cycle of the buck-boost power converter, wherein the boost cycle pulse width modulation module has a second controllable hysteresis and a hysteresis control terminal which is configured to receive a second mode transition control signal that controls the buck-boost power converter to transit between the buck-boost mode and a boost mode as well as controls the boost cycle pulse width modulation module to enable or disable the second controllable hysteresis, and wherein the boost cycle pulse width modulation module is further configured to enable the second controllable hysteresis in response to the second mode transition control signal when the buck-boost power converter transits from the buck-boost mode to the boost mode, and to disable the second controllable hysteresis in response to the second mode transition control signal when the buck-boost power converter transits from the boost mode to the buck-boost mode.

* * * * *